United States Patent
Lai et al.

(10) Patent No.: US 8,721,148 B2
(45) Date of Patent: May 13, 2014

(54) LGF PLATE-TO-PLATE MANUFACTURING METHOD AND STRUCTURE THEREOF

(75) Inventors: Hsin-Yi Lai, Taichung (TW); Erh-Ming Hsieh, Taichung (TW); Cheng-Hsien Wu, Kaohsiung (TW); Cheng-Hao Chiu, Kaohsiung (TW)

(73) Assignee: K-J Applied Materials Co., Ltd, Taichung (TW)

( * ) Notice: Subject to any disclaimer, the term of this patent is extended or adjusted under 35 U.S.C. 154(b) by 353 days.

(21) Appl. No.: 13/295,192

(22) Filed: Nov. 14, 2011

(65) Prior Publication Data
US 2012/0236574 A1 Sep. 20, 2012

(30) Foreign Application Priority Data
Mar. 18, 2011 (TW) .............................. 100109239 A

(51) Int. Cl.
*G02B 6/00* (2006.01)
(52) U.S. Cl.
USPC .......... 362/600; 264/1.24; 264/1.38; 425/104
(58) Field of Classification Search
USPC ........ 264/1.38, 1.36, 1.24, 1.7, 1.37; 425/104
See application file for complete search history.

(56) References Cited

U.S. PATENT DOCUMENTS

| 5,317,657 A * | 5/1994 | Gallo et al. ..................... 385/14 |
| 7,862,223 B2 | 1/2011 | Hsu |
| 2001/0013668 A1 * | 8/2001 | Neavin et al. .................. 264/1.7 |
| 2005/0127541 A1 * | 6/2005 | Spurgeon et al. ............ 264/1.34 |
| 2006/0062969 A1 * | 3/2006 | Honda .......................... 428/172 |
| 2009/0218707 A1 * | 9/2009 | Stover et al. ................. 264/1.34 |
| 2011/0242851 A1 * | 10/2011 | Landry et al. ................. 362/628 |

* cited by examiner

*Primary Examiner* — Laura Tso
(74) *Attorney, Agent, or Firm* — Alan Kamrath; Kamrath IP Lawfirm, P.A.

(57) ABSTRACT

A LGP plate-to-plate manufacturing includes the steps of: preparing an optical substrate with a first surface and a second surface; mechanically extruding a first integrated microstructure on the first surface of the optical substrate; coating an optical layer on the first or second surface of the optical substrate; and curing the optical layer to directly form a second microstructure on the first or second surface of the optical substrate; wherein the first integrated microstructure and the second microstructure are separately formed at a time to provide a light guide plate structure. In an embodiment, an additional optical layer is provided on the optical substrate.

18 Claims, 5 Drawing Sheets

LGF PLATE-TO-PLATE MANUFACTURING METHOD AND STRUCTURE THEREOF

BACKGROUND OF THE INVENTION

1. Field of the Invention

The present invention relates to a LGP (light guide plate) plate-to-plate (P2P) manufacturing method and a structure thereof which is applied to a LCD (liquid crystal display) backlight module. More particularly, the present invention relates to the LGP plate-to-plate manufacturing method utilizing mechanical extrusion and UV curing non-synchronously or synchronously and the structure manufactured thereby.

2. Description of the Related Art

U.S. Pat. No. 7,862,223, entitled "Thin and flexible light guide element," discloses a thin and flexible light guide element and a manufacturing method thereof. The thin and flexible light guide element comprises: a first optical layer or substrate composed of a flexible transparent material; a second optical layer formed on the lower side of the first optical layer or substrate and having a light-adjusting structure to change the light path; and a third optical layer formed on the upper side of the first optical layer or substrate and having a convex-concave structure to homogenize the light emitted from the first optical layer or substrate, wherein the first and second optical layers have different refractive indices.

The second optical layer is formed by a first composition coated on the lower-side surface of the first optical layer or substrate. The first composition includes a mixture of a UV curing resin monomer and a photo initiator. Furthermore, the third optical layer is formed in the same way by a second composition coated on the upper-side surface of the first optical layer or substrate. The second composition includes an anti-static agent, a UV curing resin, organic particles and an additive. The additive is selected from a thermal setting resin, a thermal plastic resin and a mixture thereof.

Accordingly, the first and second optical layers have relatively different refractive indices. In manufacturing, the second and third optical layers are continuously produced by a series of roll-to-roll (R2R) procedures. Namely, each of the second and third optical layers is separately formed by a curing process on each of the lower-side and upper-side surfaces of the first optical layer or substrate.

In order to form the second and third optical layers on the different two sides of the first optical layer or substrate, there require several coating and curing processes in different sides. However, the double-side coating and curing processes applied to a single thin film or plate are complex and difficult. Disadvantageously, this results in an increase of the manufacturing cost.

Consequently, there exists a need of providing a simplified method for producing such a thin and flexible light guide element. U.S. Pat. No. 7,862,223, is incorporated herein by reference for purposes including, but not limited to, indicating the background of the present invention and illustrating the state of the art.

As is described in greater detail below, the present invention provides a simplified LGP plate-to-plate manufacturing method and a structure thereof. A first integrated (extruded) microstructure is extruded on a first surface of an optical substrate and a second microstructure is formed on the optical substrate non-synchronously or synchronously in such a way as to mitigate and overcome the above problem.

SUMMARY OF THE INVENTION

The primary objective of this invention is to provide a LGP plate-to-plate manufacturing method and a structure thereof. A first integrated (extruded) microstructure is extruded on a first surface of an optical substrate and a second microstructure is formed on the optical substrate non-synchronously or synchronously. Accordingly, the LGP plate-to-plate manufacturing method is successful in reducing the manufacturing steps, total processing time, simplifying the entire structure and reducing the manufacturing cost.

The LGP plate-to-plate manufacturing method in accordance with an aspect of the present invention includes the steps of:

preparing an optical substrate with a first surface and a second surface;

mechanically extruding a first integrated microstructure on the first surface of the optical substrate;

coating or downward-coating an optical layer on the second surface of the optical substrate; and curing the optical layer to directly form a second microstructure on the second surface of the optical substrate;

wherein the first integrated microstructure and the second microstructure are separately formed at a time.

In a separate aspect of the present invention, the first integrated microstructure is continuously extruded in a plate-to-plate process.

In a further separate aspect of the present invention, when the first integrated microstructure is extruded, a UV curing resin or a thermosetting resin is coated to form the optical layer on the second surface of the optical substrate by a coating roller.

In yet a further separate aspect of the present invention, the optical layer is cured to form the second microstructure by a UV light device.

A light guide plate structure in accordance with an aspect of the present invention includes:

an optical substrate provided with a first surface and a second surface;

a first integrated microstructure mechanically extruded on the first surface of the optical substrate such that the first integrated microstructure and the optical substrate are combined in a single layer;

an optical layer coated or downward-coated on the second surface of the optical substrate;

a second microstructure formed by curing the optical layer;

wherein the first integrated microstructure and the second microstructure are separately formed at a time.

In a separate aspect of the present invention, the first integrated microstructure has a convex-concave structure, a V-shaped groove structure, a prism ridge structure or a flycut structure.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a LGP plate-to-plate manufacturing method in accordance with the preferred embodiment of the present invention is suitable for various LGP optical element. A light guide plate structure in accordance with the preferred embodiment of the present invention is suitable for assembling in any backlight module which is not limitative of the present invention.

Figure 1:
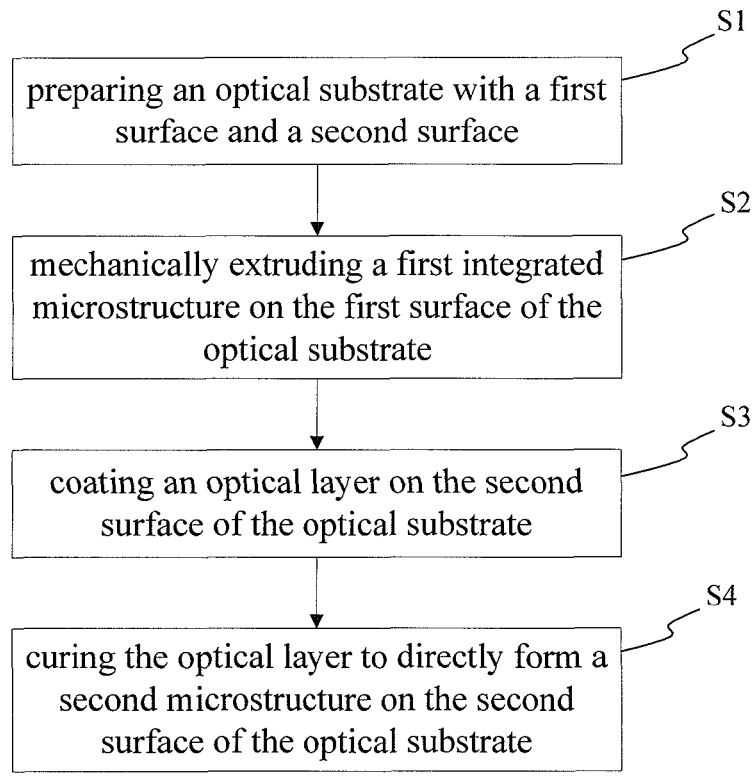
FIG. 1 is a schematic block diagram of a LGP plate-to-plate manufacturing method in accordance with a preferred embodiment of the present invention.

FIG. 1 shows a schematic block diagram of a LGP plate-to-plate manufacturing method in accordance with a preferred embodiment of the present invention, wherein four main steps are provided. Referring to FIG. 1, the LGP plate-to-plate manufacturing method includes first to fourth steps S1, S2, S3 and S4 whose orders can be changed according to the needs.

Figure 2A:
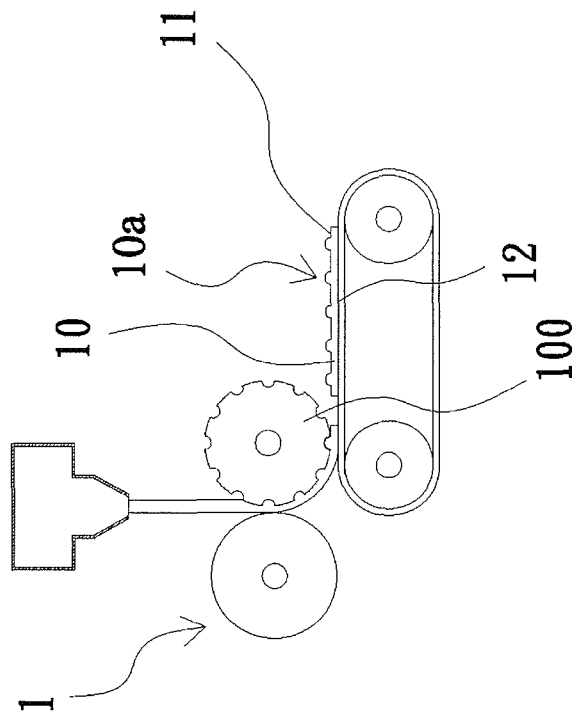
FIGS. 2A, 2B, 2C and 2D are four schematic side views of the LGP plate-to-plate manufacturing system in accordance with a preferred embodiment of the present invention.
Figure 2B:
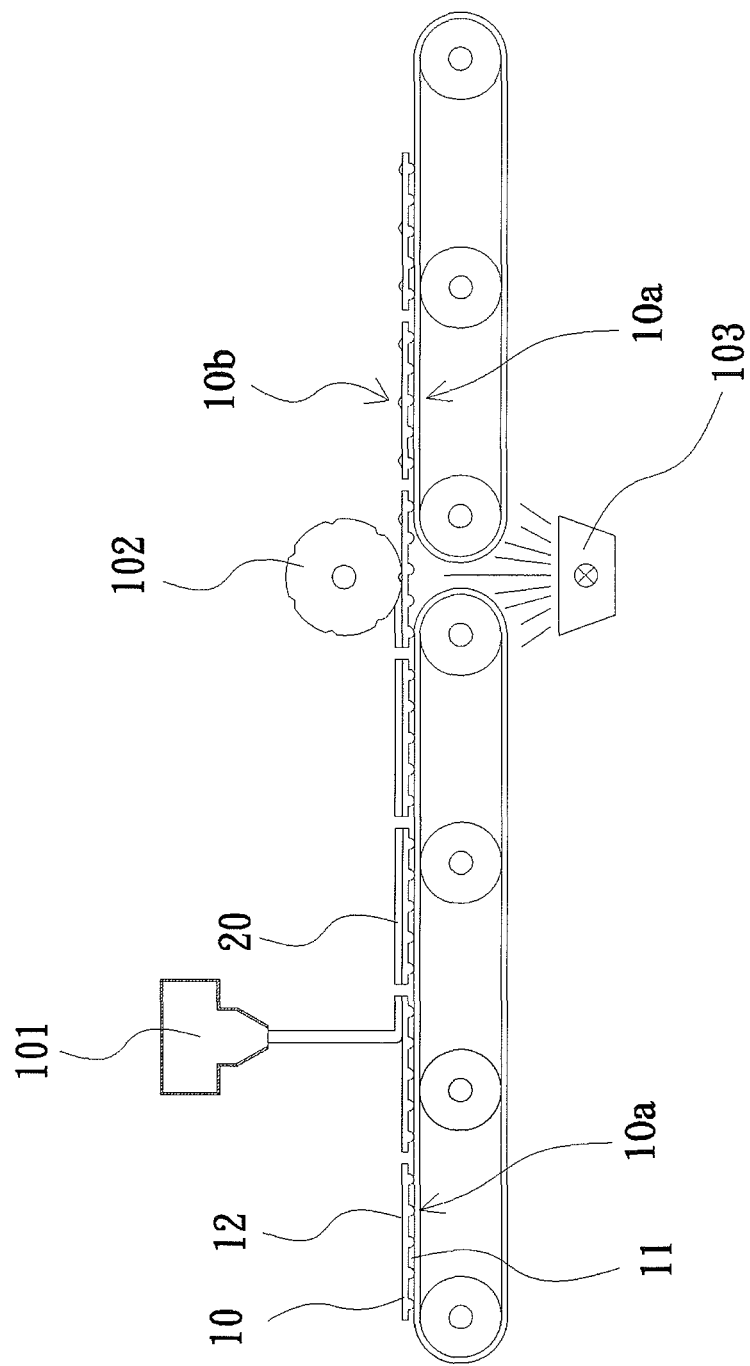

FIGS. 2A and 2B show are two schematic side views of the LGP plate-to-plate manufacturing system applied in the manufacturing method in accordance with a preferred embodiment of the present invention. In FIGS. 2A and 2B, by way of example, the LGP plate-to-plate manufacturing method shown in FIG. 1 is suitably executed in the LGP plate-to-plate manufacturing system to produce a light guide plate structure.

Referring to FIGS. 1, 2A and 2B, the LGP plate-to-plate manufacturing method in accordance with of the present invention includes first step S1: preparing and supplying an optical substrate 10 with a first surface 11 and a second surface 12. The first surface 11 and the second surface 12 are provided on opposite sides of the optical substrate 10 and designated as an upper surface and a lower surface. The optical substrate 10 is formed from a flexible transparent material such as a plastic material with a first refractive index, for example.

By way of example, the flexible transparent material is selected from: polyester resin (e.g. polyethylene terephthalate (PET) or polyethylene naphthalate (PEN)); polyacrylate resin (e.g. polymethyl methacrylate (PMMA)); polyimide resin; polyolefin resin (e.g. polyethylene (PE) or polypropylene (PP)); polycycloolefin resin; polycarbonate resin; polyurethane resin; triacetate cellulose (TAC); and a mixture thereof.

With continued reference to FIGS. 1, 2A and 2B, the optical substrate 10 is initially extracted from a nozzle (not labeled) continuously and is further conveyed by a roller assembly 1, as best shown in left side of FIG. 2A. In a preferred embodiment, the roller assembly 1 mechanically connects with an optical plate manufacturing machine (not shown) or other similar devices.

Still referring to FIGS. 1, 2A and 2B, the LGP plate-to-plate manufacturing method in accordance with of the present invention includes second step S2: mechanically extruding a first integrated (extruded) microstructure 10a on the first surface 11 of the optical substrate 10 such that the first integrated microstructure 10a and the optical substrate 10 are combined in a single layer. By way of example, the roller assembly 1 includes a pattern-printing roller 100 (as best shown in left side of FIG. 2A) which is continuously operated to extrude the first integrated microstructure 10a on the first surface 11 of the optical substrate 10. Accordingly, the first integrated microstructure 10a is continuously produced on the first surface 11 of the optical substrate 10 in a plate-to-plate process.

Turning now to FIGS. 1 and 2B, the LGP plate-to-plate manufacturing method in accordance with of the present invention includes third step S3: synchronously or non-synchronously coating or downward-coating an optical layer 20 on the second surface 12 of the optical substrate 10 by a coating assembly when extruding the first integrated microstructure 10a and conveying the optical substrate 10 on a belt conveyer, as best shown in right side of FIG. 2A. The coating assembly includes a resin-supplying nozzle 101 and a pattern-printing roller 102 provided above the optical substrate 10 and the belt conveyer, as shown in FIG. 2B, wherein the resin-supplying nozzle 101 supplies downward resin on the second surface 12 for forming the optical layer 20.

With continued reference to FIGS. 1 and 2B, the resin-supplying nozzle 101 continuously supplies a UV curing resin or a thermosetting resin on the second surface 12 of the optical substrate 10 so that the optical layer 20 is formed. Subsequently, the pattern-printing roller 102 continuously rotates to print predetermined patterns of the UV curing resin or the thermosetting resin with a second refractive index on the second surface 12 of the optical substrate 10. The second refractive index is similar to or different from the first refractive index. Preferably, the UV curing resin is selected from styrene, naphthylethylene, phenyl acrylate, naphthyl acrylate and a mixture thereof.

In another embodiment, the optical layer 20 is further selectively formed by, for example, physical vapor decomposition (PVD), chemical vapor decomposition (CVD), mechanical attachment or laser engraving technology on the second surface 12 of the optical substrate 10.

Figure 2C:
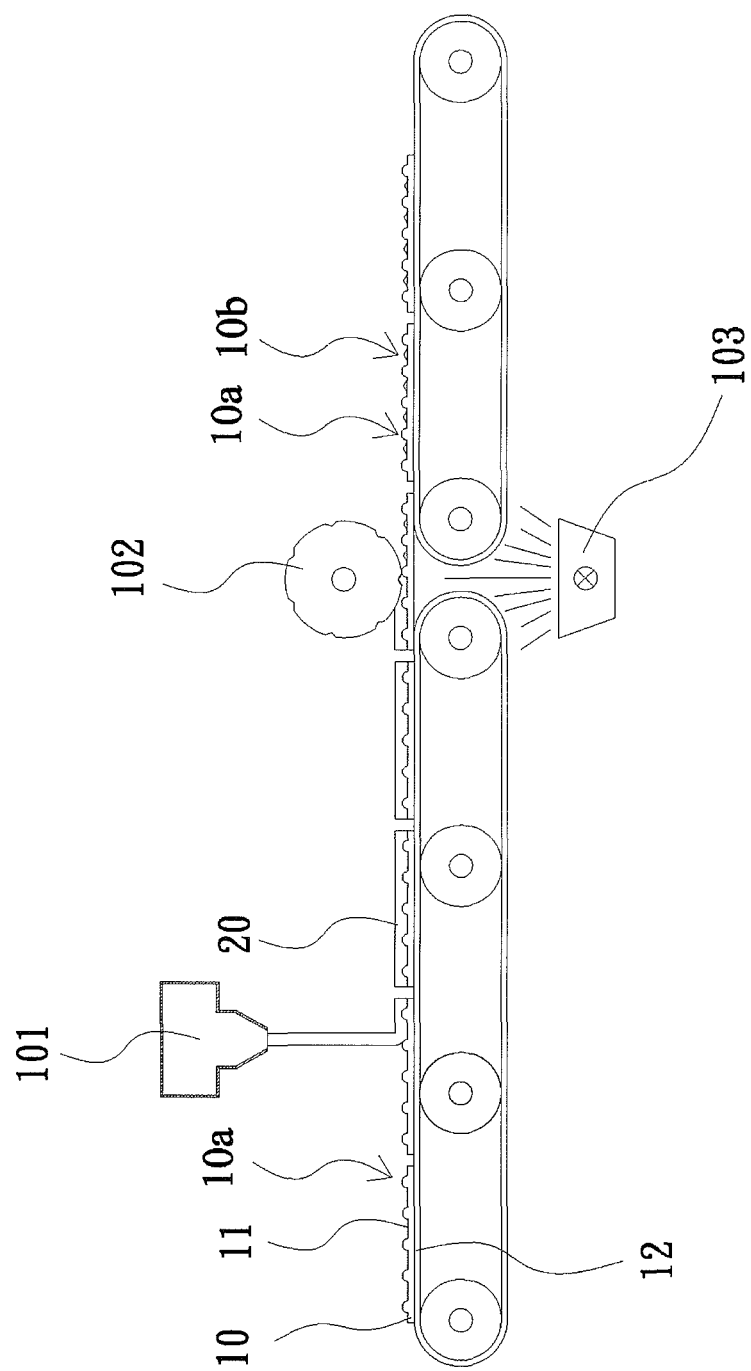

Turning now to FIG. 2C, in an alternative, the optical layer 20 is selectively coated on the first surface 11 of the optical substrate 10, when conveying the optical substrate 10 through the coating assembly. Consequently, the first integrated microstructure 10a of the optical substrate 10 is coated by the optical layer 20.

Still referring to FIGS. 1, 2B and 2C, the LGP plate-to-plate manufacturing method in accordance with of the present invention includes fourth step S4: curing the optical layer 20 to directly form a second microstructure 10b on the second surface 12 of the optical substrate 10 or the first surface 11 of the optical substrate 10. Accordingly, the first integrated microstructure 10a and the second microstructure 10b are separately formed at a time. For example, a UV light device 103 illuminates the optical layer 20 so that predetermined patterns of the second microstructure 10b are formed on the second surface 12, the first integrated microstructure 10a or both. In an embodiment, the UV light device 103 is mounted above or below the optical substrate 10.

Figure 2D:
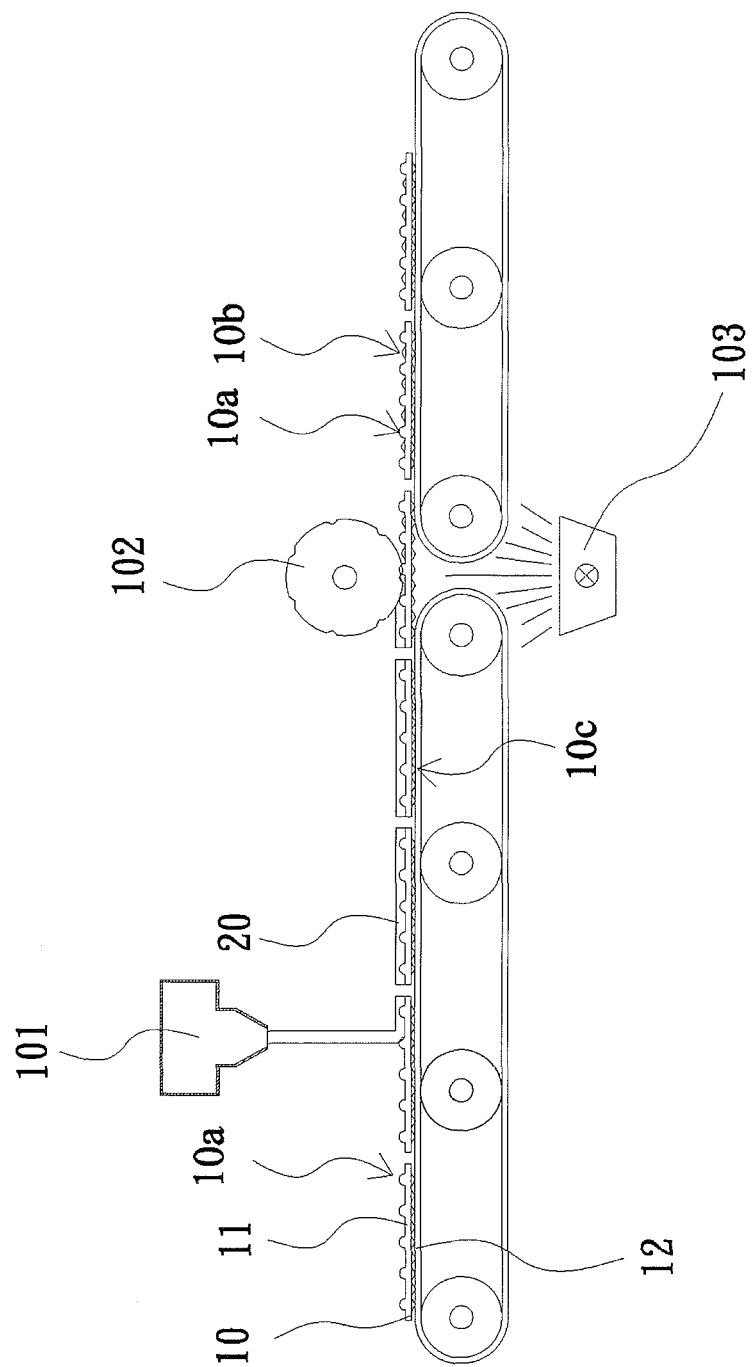

Turning now to FIG. 2D, in an alternative, an additional microstructure 10c is provided on the second surface 12 of the optical substrate 10 and is formed by the process shown in FIG. 2B, for example.

Figure 3:
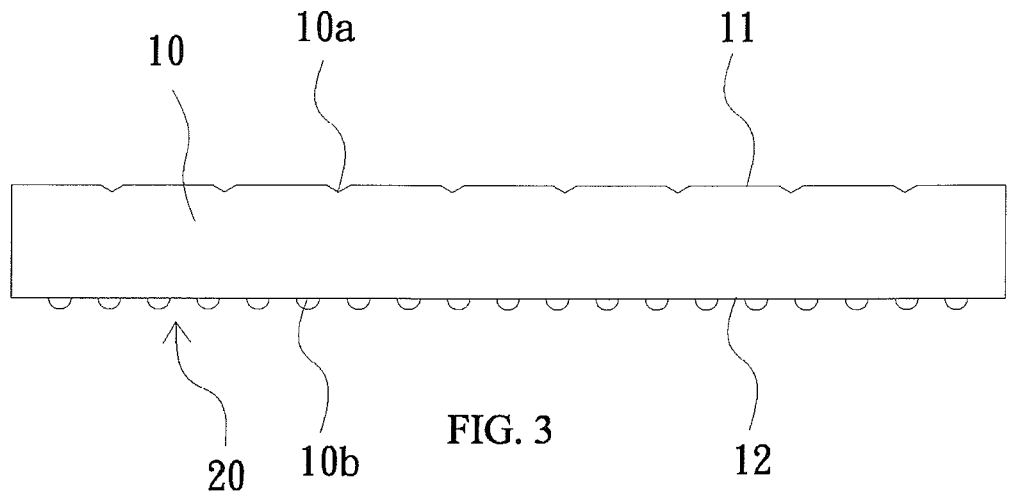
FIGS. 3 through 5 are three side schematic views of LGP structures produced by the manufacturing method in accordance with the preferred embodiment of the present invention.

FIG. 3 shows a side schematic view of a LGP structure in accordance with the first preferred embodiment of the present invention produced by the manufacturing method shown in FIGS. 1 and 2A-2D. Referring to FIG. 3, the LGP structure in accordance with the first preferred embodiment of the present invention includes two microstructures, and each of two optical layers is arranged to provide the corresponding microstructure.

Referring to FIGS. 2A, 2B and 3, the two optical layers of the LGP structure correspond to the optical substrate 10 and the optical layer 20. The first surface 11 of the optical substrate 10 is designated as a light-entering surface while the second surface 12 located at the optical layer 20 is designated as a light-emitting surface. Furthermore, the two microstructures the LGP structure correspond to the first integrated microstructure 10a and the second microstructure 10b, wherein the first integrated microstructure 10a has a function of condensing light and the second microstructure 10b has a function of homogenizing light.

Still referring to FIGS. 2A, 2B and 3, the first integrated microstructure 10a has a V-shaped groove structure or a flycut structure directly extruded on the first surface 11 of the optical substrate 10 such that the first integrated microstructure 10a and the optical substrate 10 are combined as a single optical layer. In addition, the second microstructure 10b is further formed on the second surface 12 located at the optical layer 20.

Figure 4:
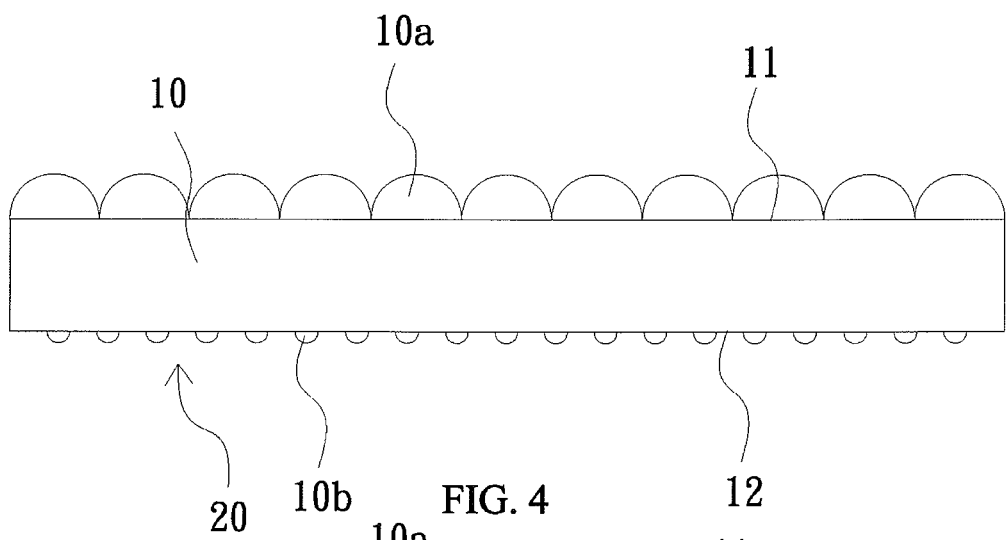

FIG. 4 shows a side schematic view, similar to that shown in FIG. 3, of a LGP structure in accordance with the second preferred embodiment produced by the manufacturing method shown in FIGS. 1 and 2A-2D. Referring to FIG. 4, the LGP structure of the second preferred embodiment includes a convex-concave structure of the first integrated microstructure 10a. Each ridge of the convex-concave structure extends and winds its path on the first surface 11 of the optical substrate 10.

Figure 5:
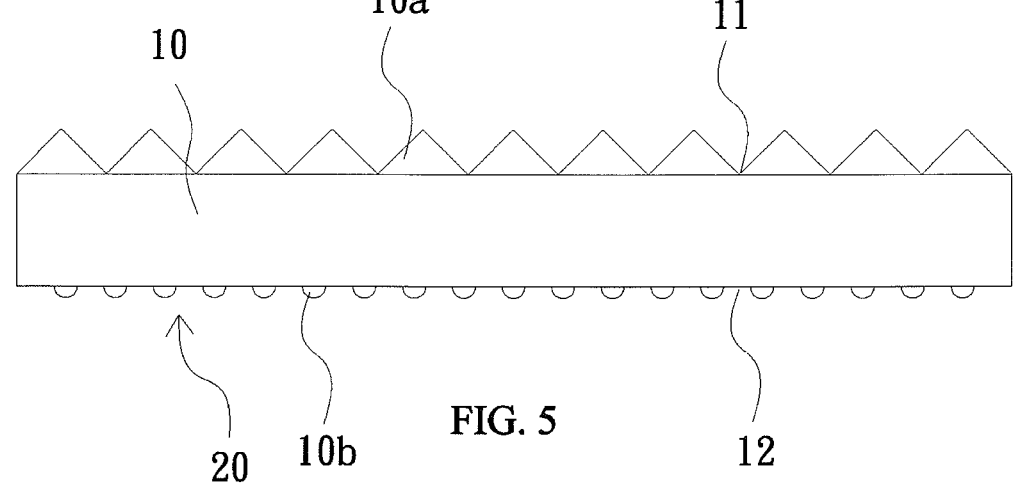

FIG. 5 shows a side schematic view, similar to that shown in FIG. 3, of a LGP structure in accordance with the third preferred embodiment produced by the manufacturing method shown in FIGS. 1 and 2A-2D. Referring to FIG. 5, the LGP structure of the third preferred embodiment includes a prism ridge structure of the first integrated microstructure 10a.

Although the invention has been described in detail with reference to its presently preferred embodiment(s), it will be understood by one of ordinary skill in the art that various modifications can be made without departing from the spirit and the scope of the invention, as set forth in the appended claims.

What is claimed is:

1. A LGP plate-to-plate manufacturing method comprising the steps of:
    preparing an optical substrate with a first surface and a second surface;
    mechanically extruding a first integrated microstructure on the first surface of the optical substrate;
    coating an optical layer on the second surface of the optical substrate; and
    curing the optical layer to directly form a second microstructure on the second surface of the optical substrate.

2. The manufacturing method as defined in claim 1, wherein the first integrated microstructure is continuously extruded in a plate-to-plate process.

3. The manufacturing method as defined in claim 1, wherein a UV curing resin or a thermosetting resin is coated to form the optical layer on the second surface of the optical substrate, when the first integrated microstructure is extruded.

4. The manufacturing method as defined in claim 1, wherein the optical layer is formed by physical vapor decomposition, chemical vapor decomposition, mechanical attachment or laser engraving.

5. The manufacturing method as defined in claim 1, wherein a UV curing resin or a thermosetting resin is coated to form an additional optical layer on the first surface of the optical substrate, when the first integrated microstructure is extruded.

6. The manufacturing method as defined in claim 5, wherein the additional optical layer is cured to form an additional microstructure.

7. The manufacturing method as defined in claim 1, wherein the first integrated microstructure and the second microstructure are separately formed at a time.

8. A LGP plate-to-plate manufacturing method comprising the steps of:
    preparing an optical substrate with a first surface and a second surface;
    mechanically extruding a first integrated microstructure on the first surface of the optical substrate;
    coating an optical layer on the first surface of the optical substrate; and
    curing the optical layer to directly form a second microstructure on the first surface of the optical substrate.

9. The manufacturing method as defined in claim 8, wherein the first integrated microstructure is continuously extruded in a plate-to-plate process.

10. The manufacturing method as defined in claim 8, wherein a UV curing resin or a thermosetting resin is coated to form the optical layer on the first surface of the optical substrate, when the first integrated microstructure is extruded.

11. The manufacturing method as defined in claim 8, wherein the optical layer is formed by physical vapor decomposition, chemical vapor decomposition, mechanical attachment or laser engraving.

12. The manufacturing method as defined in claim 8, wherein a UV curing resin or a thermosetting resin is coated to form an additional optical layer on the second surface of the optical substrate, when the first integrated microstructure is extruded.

13. The manufacturing method as defined in claim 12, wherein the additional optical layer is cured to form an additional microstructure.

14. The manufacturing method as defined in claim 8, wherein the first integrated microstructure and the second microstructure are separately formed at a time.

15. A light guide plate structure comprising:
    an optical substrate provided with a first surface and a second surface;
    a first integrated microstructure mechanically extruded on the first surface of the optical substrate such that the first integrated microstructure and the optical substrate are combined in a single layer;
    an optical layer coated on the first surface or the second surface of the optical substrate;
    a second microstructure formed by curing the optical layer.

16. The light guide plate structure as defined in claim 15, wherein the first integrated microstructure and the second microstructure are separately formed at a time.

17. The light guide plate structure as defined in claim 15, wherein the first integrated microstructure has a convex-concave structure, a V-shaped groove structure, a prism ridge structure or a flycut structure.

18. The light guide plate structure as defined in claim 15, wherein an additional optical layer coated on the second surface or the first surface of the optical substrate to form a microstructure.

* * * * *